UNITED STATES PATENT OFFICE.

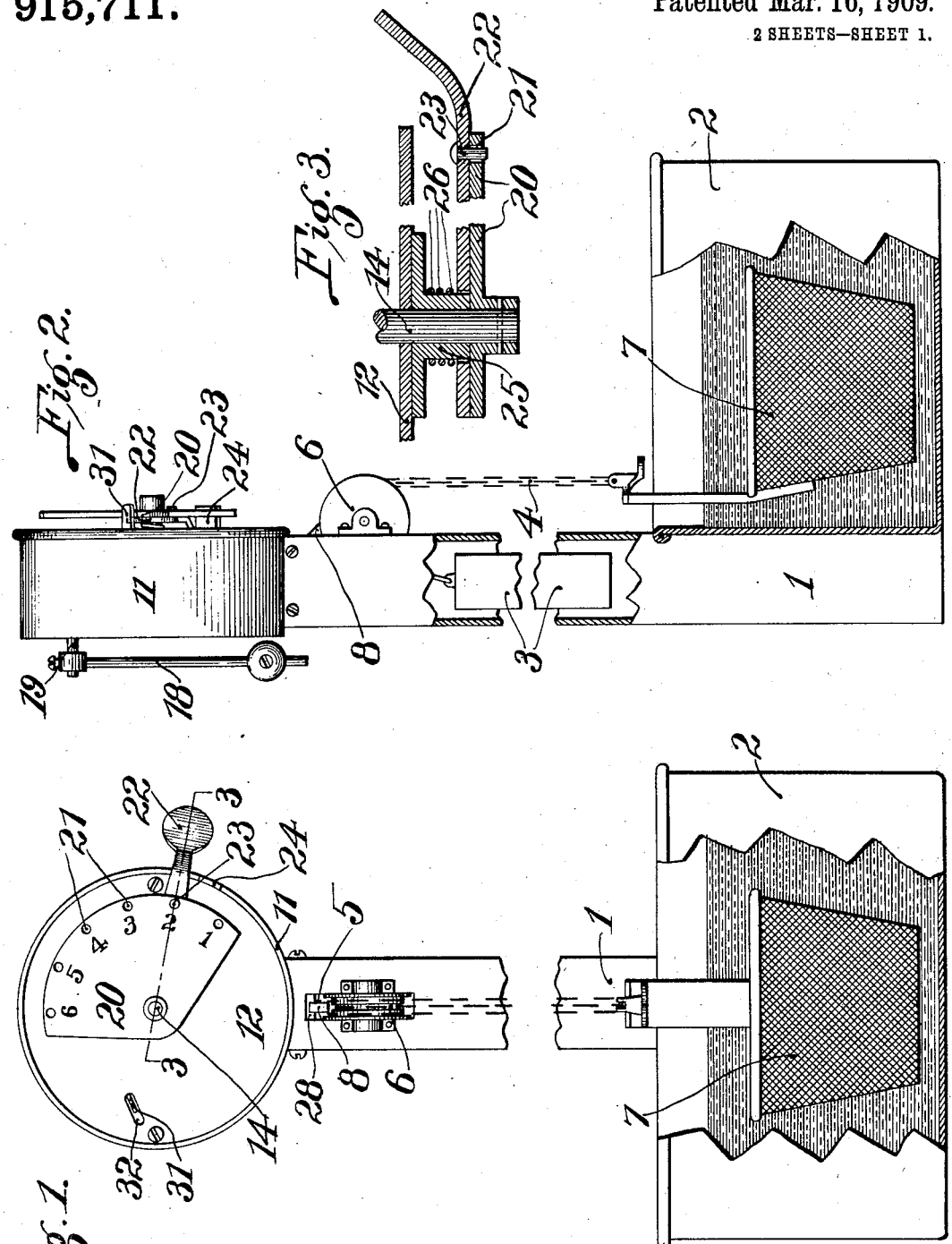

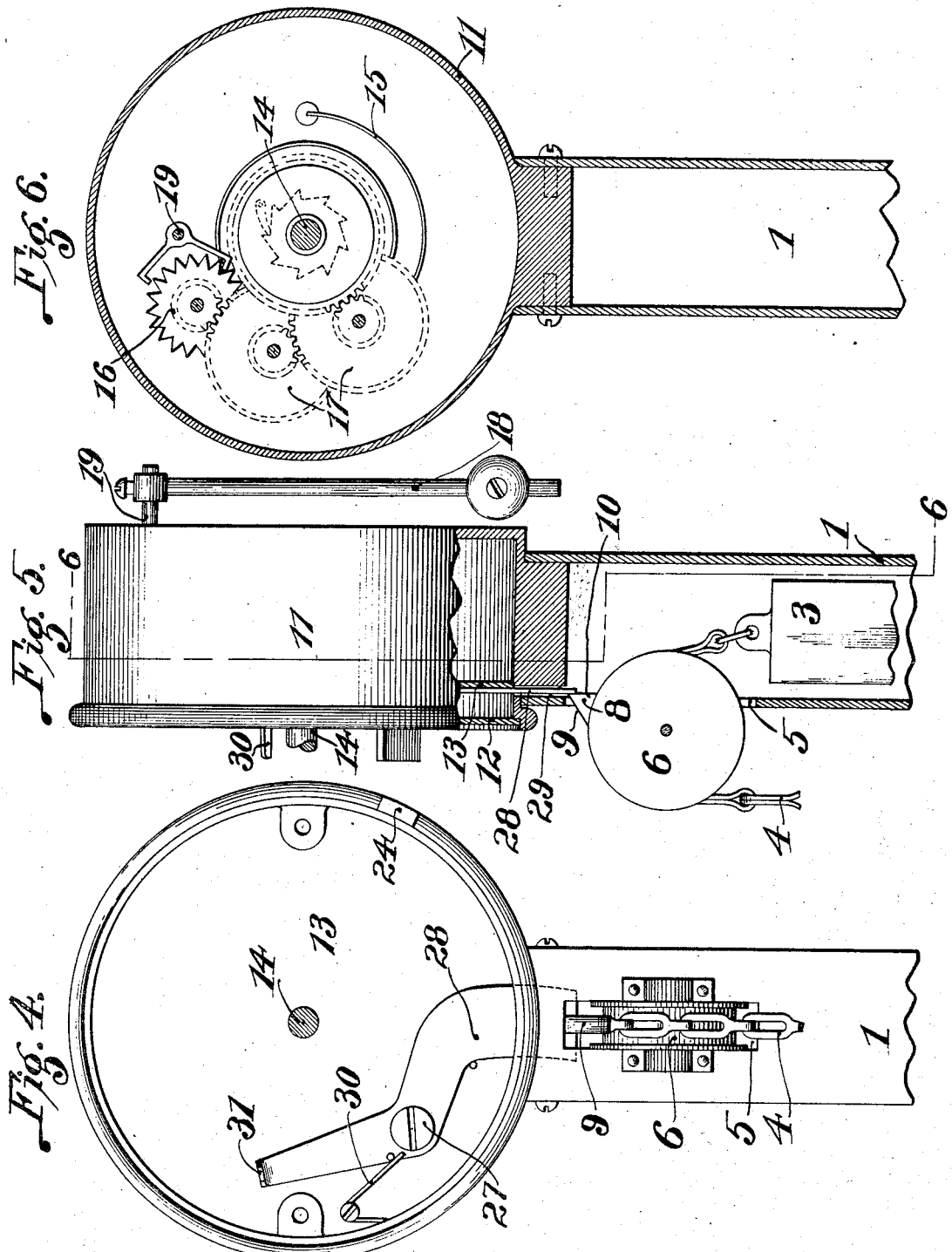
C. H. BLANCHARD, DEC'D.
M. J. BLANCHARD, EXECUTRIX.
EGG BOILER.
APPLICATION FILED OCT. 30, 1907.
915,711.
Patented Mar. 16, 1909.
2 SHEETS—SHEET 2.
Attest.
Edgar T. Farmer.
W. O. Smith
Inventor:—
CHARLES H. BLANCHARD.
By Higdon & Longan
Attys.

CHARLES H. BLANCHARD, OF WEBSTER GROVES, MISSOURI; MARY J. BLANCHARD EXECUTRIX OF SAID CHARLES H. BLANCHARD, DECEASED.

EGG-BOILER.

No. 915,711.    Specification of Letters Patent.    Patented March 16, 1909.

Application filed October 30, 1907. Serial No. 399,948.

*To all whom it may concern:*

Be it known that I, CHARLES H. BLANCHARD, a citizen of the United States, and resident of Webster Groves, St. Louis county, Missouri, have invented certain new and useful Improvements in Egg-Boilers, of which the following is a specification containing a full, clear, and exact description, reference being had to the accompanying drawings, forming a part hereof.

My invention relates to an egg boiler, or to an apparatus to be used in conjunction with a basin of water for automatically regulating the time of immersion of eggs, or the like, in boiling water; and the object of my invention is to provide simple means whereby the automatic mechanism may be set to operate at various periods of time.

To the above purposes, my invention consists in certain novel features of construction and arrangement of parts, which will be hereinafter more fully set forth, pointed out in the claims, and illustrated in the accompanying drawings, in which:—

Figure 1 is a front elevation of an egg boiler of my improved construction; Fig. 2 is a side elevation of the apparatus, with parts broken away, in order to more clearly illustrate the same; Fig. 3 is an enlarged detail section taken on the line 3—3 of Fig. 1; Fig. 4 is a front elevation of the housing in which the clock mechanism is located, and with the front plate of the housing removed; Fig. 5 is an elevation of the housing seen in Fig. 4, and with the lower portion of said housing in vertical section; Fig. 6 is a vertical section taken on the line 6—6 of Fig. 5.

Referring by numerals to the accompanying drawings:—1 designates a vertically disposed tube, which is supported in any suitable manner adjacent a water receptacle 2, which may be heated in any suitable manner to boil the water therein. Arranged for vertical movement within the tube 1 is a weight 3, to the upper end of which is secured one end of a chain or cable 4, which passes upward through an opening 5 formed in the front wall of the tube adjacent the upper end, and said chain or cable passing around a grooved pulley 6 fixed to the tube 1, and the opposite end of said chain or cable being fixed to a basket or perforated sheet metal container 7, which is adapted to receive the eggs or other articles of food to be cooked by the boiling water within the receptacle 2.

Fixed on one of the links of the chain 4, adjacent the weight 3, is a block 8, having a beveled front face 9, and a straight rear face 10.

Detachably fixed in any suitable manner to the upper end of the tube 1 is a housing 11, provided with a removable front plate 12, and with a partition 13, located a short distance to the rear of said front plate. Journaled for rotation in the center of this housing is a shaft 14, which is driven by an ordinary spiral spring 15, and the rotary motion of this shaft is governed by an ordinary escapement 16 connected to said shaft by a suitable train of gearing 17, and there being a pendulum 18 arranged in the usual manner on the pallet shaft 19 of the escapement.

Rigidly fixed in any suitable manner to the front end of the shaft 14, in front of the plate 12, is a segmental plate 20, and formed adjacent the edge thereof is a series of apertures 21, which are located at equal distances apart, and said apertures being consecutively numbered. Arranged immediately against the rear face of this plate 20 is an arm 22, which carries a pin 23, adapted to enter any one of the apertures 21; and said arm projects beyond the face of the housing, and there being a lug or stop 24 formed on the edge of the housing against which the arm engages when moved downward, as is the case when the apparatus is set for use. The inner end of the arm 22 is loosely arranged on a hub 25, fixed on the center of the plate 12, and located on said hub and interposed between the plate and the arm is an expansive coil spring 26, which normally maintains the arm against the segmental plate 20.

Fulcrumed on a pin 27, which is seated in the partition plate 13, is a bent lever 28, the lower end of which projects through an opening 29 formed in the bottom of the housing 11, and said lower end of the lever normally occupying a position across the upper end of the opening 5 in the tube 1, and directly in the path of travel of the outer portion of the block 8. A spring 30 bears against one side of this lever 28 to hold the same in proper position, and the upper end of said lever is bent horizontally forward, as designated by 31, and said forwardly bent end projects through a slot 32 formed through the front plate 12, and which slot is concentric with the pivot pin 27.

To set my improved apparatus for use, the operator engages the outer end of the arm 22, and moves the same rearwardly so as to disengage the pin 23 from the aperture in which it has been positioned, and then rotates the arm in either direction so as to bring the pin 23 into the aperture corresponding to the time of the maintenance of the basket or container 7 in the boiling water. In the present instance, it is assumed that the apparatus is used as an egg boiler, and the spaces between the apertures 21, which latter are numbered consecutively from "1" to "6", represent periods of one minute each. The engagement of the pin 23 in one of the apertures locks the arm 22 to the plate 20, and when the arm 22 is now moved downwardly until it engages against the stop 24, the segmental plate 20 will be correspondingly moved, and the shaft 14 on which said plate 20 is fixed will be partially rotated, thus partially winding and storing power in the spring 15. Just prior to, or immediately after the rotation of the shaft 14, the basket or container 7 containing the eggs to be boiled is moved downward until submerged in the boiling water within the receptacle 2; and this movement elevates the weight 3, and brings the block 8 into a position in front of the lower end of the lever 28, with the straight rear face 10 of said block engaging the lower end of said lever. The clock mechanism, comprising the train of gearing 17 and escapement 16, now operates in the usual manner, owing to the power stored in the spring 15, and the motion of said mechanism is controlled by the pendulum 18. The shaft 14 is slowly rotated by the clock mechanism, and the plate 20 and arm 22 are moved together on said shaft 14; and, owing to the size of the segmental plate 20 and the arrangement of the apertures 21 therein, the left hand edge of said plate 20 will engage the forwardly bent end 31 of the lever 28 at the expiration of the time for which the apparatus has been set; and, as said plate 20 bears against the bent end 31 of the lever, the lower end thereof will be elevated, thus releasing the block 8, which permits the weight 3 to drop; and, as a result, the basket 7 is drawn out of the boiling water and elevated.

When the apparatus is reset for use, the arm 22 is moved downward until it engages against the lug 24, which movement rewinds the spring 15 and stores power therein; and thus said spring is rewound each time the apparatus is set for use.

My apparatus can be advantageously applied for various uses, although it is particularly adapted for use as an egg boiler; and said apparatus is easily adjusted and set for use, comprises a minimum number of parts, and is very accurate and efficient in use.

I claim:—

1. In an apparatus of the class described, a standard, a pulley arranged thereon, a flexible member passing around the pulley, a container fixed to one end of the flexible member, a weight carried by the opposite end of the flexible member, a block fixed on the flexible member, a lever, a lever engaging member arranged to strike against the free end of the lever to disengage the lower end from the block, an arm adjustably arranged on the lever engaging member for regulating the distance of travel of said lever engaging member, and a clock mechanism for imparting motion to the lever engaging member and the arm.

2. In an apparatus of the class described, a standard, a pulley arranged thereon, a flexible member passing over the pulley, a container arranged on one end of the flexible member, a weight carried by the opposite end of the flexible member, a projecting member carried by the flexible member, a movable member for engaging the projecting member when the weight is elevated, an adjustable member for engaging the movable member to release the projecting member, a spring actuated chronometric mechanism for actuating the adjustable member, and the spring of which chronometric mechanism is wound when the adjustable member is set for operation.

3. In an apparatus of the class described, a standard, a pulley arranged thereon, a flexible member passing around the pulley, a container fixed to one end of the flexible member, a weight carried by the opposite end of the flexible member, a block fixed on the flexible member, a detent adapted to engage the block when the weight is elevated, a spring driven chronometric mechanism, and an adjustable member actuated by said chronometric mechanism for engaging the detent to release the block.

4. In an apparatus of the class described, a standard, a pulley arranged thereon, a flexible member passing over the pulley, a container carried by one end of the flexible member, a weight carried by the opposite end of the flexible member, a block fixed on the flexible member, a detent adapted to engage the block when the weight is elevated, a spring actuated chronometric mechanism, an arm driven by said chronometric mechanism, and an adjustable plate arranged upon said arm, and which plate is adapted to engage against the detent to actuate the same and release the block on the flexible member.

In testimony whereof, I have signed my name to this specification, in presence of two subscribing witnesses.

CHARLES H. BLANCHARD.

Witnesses:
M. P. SMITH,
E. L. WALLACE.